United States Patent
Blaich et al.

(10) Patent No.: US 8,813,210 B2
(45) Date of Patent: Aug. 19, 2014

(54) ENHANCING NETWORK CONTROLS IN MANDATORY ACCESS CONTROL COMPUTING ENVIRONMENTS

(75) Inventors: Andrew C. Blaich, Menlo Park, CA (US); Onur Aciicmez, Santa Clara, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 142 days.

(21) Appl. No.: 13/306,697

(22) Filed: Nov. 29, 2011

(65) Prior Publication Data

US 2013/0139244 A1 May 30, 2013

(51) Int. Cl.
*G06F 9/00* (2006.01)
*G06F 15/16* (2006.01)
*G06F 17/00* (2006.01)

(52) U.S. Cl.
USPC .................. 726/11; 726/2; 726/3; 726/14

(58) Field of Classification Search
CPC ..... H04L 63/02; G06F 21/00; G06F 21/6209; G06F 21/51; G06F 21/53
USPC .......................... 726/1, 2, 3, 11, 14
See application file for complete search history.

(56) References Cited

U.S. PATENT DOCUMENTS

| | | | |
|---|---|---|---|
| 7,836,490 B2 | 11/2010 | Smith | |
| 2004/0015701 A1* | 1/2004 | Flyntz | 713/182 |
| 2004/0250113 A1* | 12/2004 | Beck | 713/201 |
| 2005/0138423 A1* | 6/2005 | Ranganathan | 713/201 |
| 2007/0180509 A1* | 8/2007 | Swartz et al. | 726/9 |
| 2008/0127297 A1* | 5/2008 | Morris | 726/1 |
| 2008/0209501 A1* | 8/2008 | Mayer et al. | 726/1 |
| 2008/0209535 A1* | 8/2008 | Athey et al. | 726/11 |
| 2009/0198697 A1* | 8/2009 | Bilger et al. | 707/9 |
| 2009/0271844 A1* | 10/2009 | Zhang et al. | 726/2 |

OTHER PUBLICATIONS

Kahn et al., "A Comprehensive Analysis of MAC Enhancements for Leveraging Distributed MAC", Proceedings of the International MultiConference of Engineers and Computer Scientists, IMECS, Mar. 19-21, 2008, vol. 1.

* cited by examiner

*Primary Examiner* — Eleni Shiferaw
*Assistant Examiner* — Jing Sims
(74) *Attorney, Agent, or Firm* — Kenneth L Sherman, Esq.; Michael Zarrabian, Esq.; Sherman & Zarrabian LLP (57) ABSTRACT

A Mandatory Access Control (MAC) aware firewall includes an extended rule set for MAC attributes, such as a security label or path. Application labels may be used to identify processes and perform firewall rule-checking. The firewall rule set may including conventional firewall rules, such as address checking, in addition to an extension for MAC attributes.

24 Claims, 8 Drawing Sheets

App A wants to write data to the socket for IP address 74.125.71.147

FIG. 1
(PRIOR ART)

App A wants to write data to the socket for IP address 74.125.71.147

ENHANCING NETWORK CONTROLS IN MANDATORY ACCESS CONTROL COMPUTING ENVIRONMENTS

FIELD OF THE INVENTION

The present invention is generally directed to the field of access control in a computing system. More particularly, the present invention is related to improvements in firewall technology in a computing system having Mandatory Access Control.

BACKGROUND OF THE INVENTION

Figure 1:
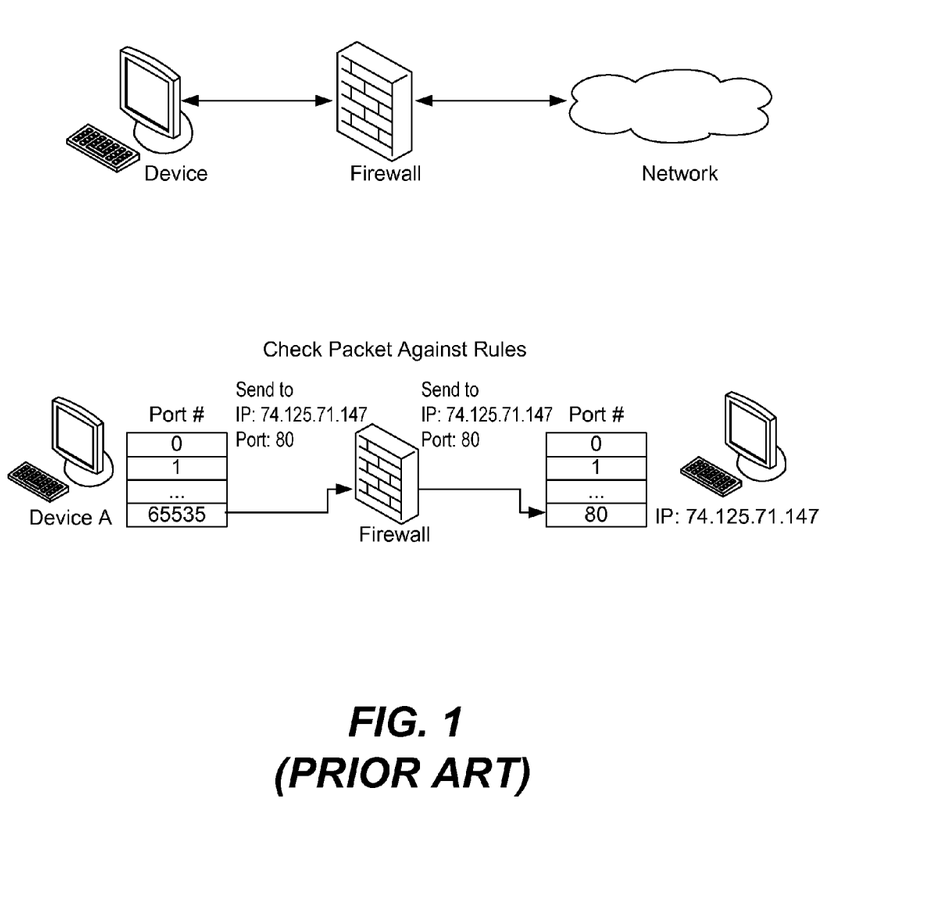
FIG. 1 illustrates a conventional firewall in accordance with the prior art.

For network access control, the most ubiquitous form of security protection is the firewall. A firewall is a way, in computing, to allow or deny the transmission of data to or from a device. FIG. 1 shows a device accessing a network through a conventional firewall to illustrate how a traditional firewall works. An example of a traditional firewall is iptables, which is included with the Linux operating system There are many different types of firewalls (client side, server side, packet based, socket based, application aware, or stateless), but the key characteristic of all conventional firewalls is that they operate on the notion of the source or destination address and/or the source or destination port number specified in a data packet. A data packet is a piece of data that has been formatted properly with the appropriate addresses and information necessary so that it can be routed to its intended destination with a data payload across a network or series of networks.

An address in networking is commonly referred to as an IP Address, where IP stands for Internet Protocol. There are two versions of IP used today IPv4 (whose address space just ran out) looks like 192.168.1.1 and IPv6 (a new variant of IP that has had slow uptake) looks like 2001:0db8:85a3:0000:0000: 8a2e:0370:7334. Every machine on the internet receives an IP address (whether private or public); this is the main way that machines are able to locate other machines in a network in order to send and/or receive data. On each device, an application or series of applications are responsible for sending and/or receiving data packets. Data is routed to the IP address that corresponds to a machine; however where it goes once it gets to the machine is a decision that is up to the port number being used. The port number can be thought of as the individual apartments at an apartment complex, where the IP address is the address of the building and each apartment is a port number, and the applications are the residents in the apartments. A port number can only be used by one application at any time on the same device. The port number is bound to the connection (socket) until the connection is terminated, at which point the port number is allowed to be recycled. IP addresses and port numbers make up the core components of a single firewall rule.

Typically, network access control has been handled by a firewall either on the device or somewhere else in the network. Yet, a problem with conventional firewalls is that granularity of the firewall (for example iptables) is limited. That, is conventional firewalls provide coarse control, based on rules such as checking IP addresses, but are not well-suited for providing access control at finer layers of control.

SUMMARY OF THE INVENTION

A firewall is aware of Mandatory Access Control (MAC) attributes, such as security labels or paths. The MAC aware firewall performs rule checking that includes the MAC attributes. As a result, firewall rule checking for applications or processes may be performed in addition to conventional firewall rule checking. The MAC aware firewall provides for finer granularity of control of a firewall and is compatible with MAC based computing environments.

DETAILED DESCRIPTION

Figure 2:
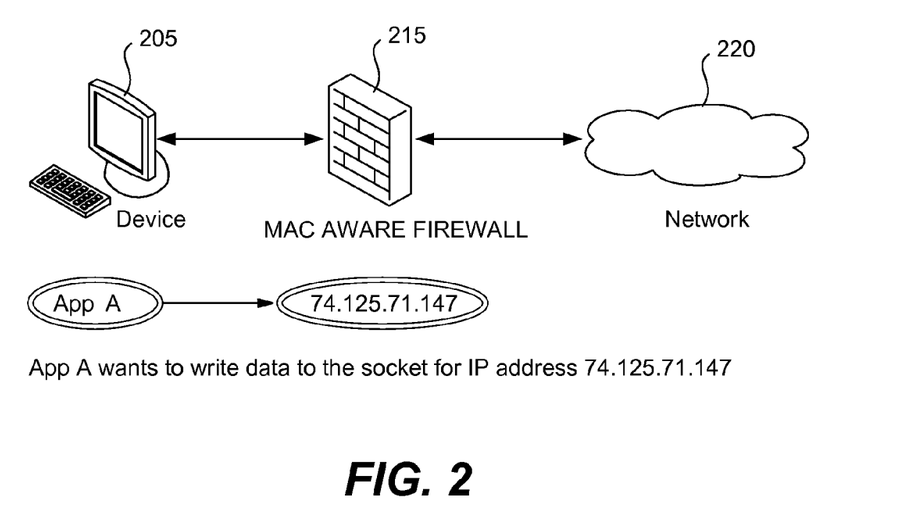
FIG. 2 illustrates a MAC aware firewall in accordance with an embodiment of the present invention.

Referring to FIG. 2, broadly speaking the present invention is directed to a Mandatory Access Control (MAC) aware firewall 215 to provide access control between a device 205 and a network 220 to decide which applications are allowed to send or receive data from the network in a MAC environment. The MAC Aware firewall may be implemented to include conventional firewall rules based on source/destination addresses in conjunction with an extended rule-set. The extended rule set includes rules based on at least one MAC process/application attribute for an application making a socket connection. The MAC process/application attribute is generated by a network and may, for example, include a MAC security label or path of the process on the system.

The firewall 215 may reside in the operating system of an individual computing device 205 having a processor and a memory. Alternatively, firewall 215 may resides in a server or router (not shown in FIG. 2).

Figure 3:
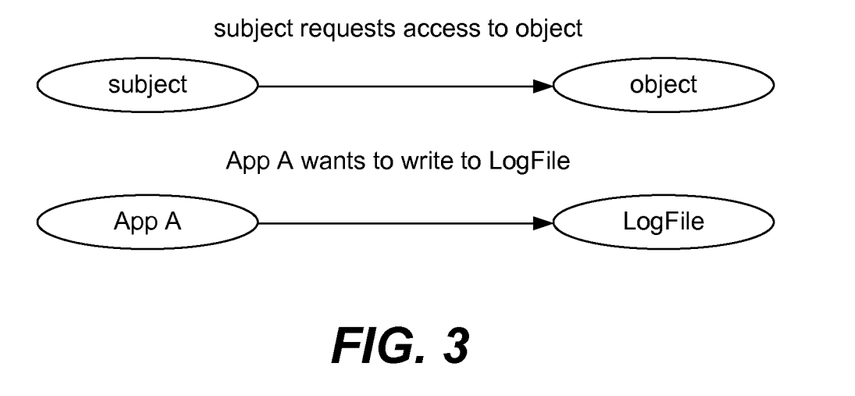
FIG. 3 illustrates MAC subject and object awareness pertinent to understanding aspects of the MAC aware firewall of FIG. 2.

One aspect of the present invention is deciding which applications should be allowed to send or receive data from the network and how to enforce this policy in a MAC environment. The present invention enables firewalls to take advantage of the method of enforcement of MAC technologies to provide a tighter integration with the MAC, while indirectly enhancing the network control ability of the MAC. Exemplary implementations include the use of security labels or defined paths, leveraging off of MAC mechanisms used for different purposes. Referring to FIG. 3, MAC mechanisms employ a subject-object paradigm for accesses. If Application (App) A wants to write to a LogFile, the MAC checks the security policy to allow or deny the access. MAC is a type of access control on a computing device in which the system determines which subjects have access to what objects in order to perform an operation such as read, write, or execute. Subjects and objects are any and all objects on a file-system.

MAC controls can constrain users that have limited privileges, but also users that have administrator privileges, unlike in a Discretionary Access Control (DAC). In the case of a MAC the system determines the policy that is followed, not the users. Examples of MACs include Security Enhanced Linux® (SELinux) and the Simplified Mandatory Access Control Kernel or SMACK. Discretionary Access Controls or DAC is similar to a MAC because subjects are requesting access to objects in order to perform specific operations. However, in a DAC environment users can change or modify the policy.

MACs have the potential to provide better security than DACs, because the system is enforcing the policy. This is important to note because the use of security frameworks and control mechanisms continues to increase. The reason for this increase is that security is becoming a higher priority than it has been in the past. The priority of security has increased because of the continued increase in rogue applications, malicious code, or malicious users that are trying to steal private user information or infect a system for nefarious purposes. Solutions are needed to mitigate these issues. One of the problems related to all of the issues described is the network connectivity of an application.

A limiting factor of conventional firewalls, such as iptables, is that they lack the ability to tell which packets from what process should pass through the firewall for a specific IP address or port number. While port numbers exist to infer application use, port 80 is commonly used for http traffic to a web-server, it is also used for VoIP and Peer to Peer file transfer traffic as it is commonly an open port in the firewall. Firewalls using port numbers are helpful in limiting applications to only being able to use certain port numbers out of the possible 2^16 values, but the control is limited because of application inference.

Conventional firewalls are not MAC aware. MAC technologies provide only limited network control and this control is nowhere near as comprehensive as the iptables used in firewalls. For example, in SMACK, network control rules are written by specifying the IP address and the label allowed to access it while also providing rules in the main access control list to allow read and write access in both directions (input and output) to the label for that IP address from other labels. These rules are limited in enforcement options more than a traditional firewall is capable of providing. However, a conventional firewall does not take into account the MAC or interact with it. Essentially, existing firewall technology has a robust set of controls, while MAC network control mechanism are feature limited. In accordance with the present invention, if a firewall becomes, in a sense, MAC aware, it can enhance the network control in the MAC indirectly, i.e. without modification to the MAC.

An aspect of the present invention is that is allows for the robust network control features of existing firewalls to be used in conjunction with MAC systems and their security policy mechanisms. MAC mechanisms commonly use a label or path-based enforcement mechanism. In a label-based enforcement solution an attribute is assigned to an object in a file-system (directly or indirectly); policy is written that dictates how labeled objects are allowed to interact with other labeled objects. In a path-based system, the path on the file-system that is being access is described in a policy file with the associated file-system permissions that an object is allowed to access said path with. While SMACK and other MAC mechanisms provide limited network control functionality, they lack the robustness that exists in firewall systems such as iptables. However, iptables, is not SMACK aware. The present invention describes an apparatus, system, method, and computer program product in which computing systems incorporating MACs, using either labels or path-based enforcement, can take advantage of firewall technology by having the firewall extended so that it can match against the respective enforcement attributes (labels or paths) in the rules for the firewall.

A preferred embodiment of the present invention is implemented as an extension of the rule set to the iptables/NetFilter firewalling mechanism already present in Linux®. As was described earlier, the purpose of this invention is to enhance the network access controls of MAC mechanisms by extending existing firewall technology. MAC mechanisms, such as SMACK, will label all of the objects in a file system with an extended attribute from the security namespace. The labels assigned to file system objects are used when a subject requests access to an object. The label from a subject and the label from an object are checked in the loaded security policy for a match, if a match is found the granted permissions are allowed, however if no match is found, or if an access other than what is allowed is attempted, the access is denied. The same is true in the basic functionality that exists in SMACK for network access. In SMACK network control, an IP address is supplied and associated with a label. Any subject that wishes to send data to a specified IP address needs to have write access to the label associated with the specific IP address; additionally a rule for data coming back from the IP address needs to be supplied that has the label associated with the IP address acting as the subject and the application that needs to receive the data will have read access granted for its label.

Figure 4:
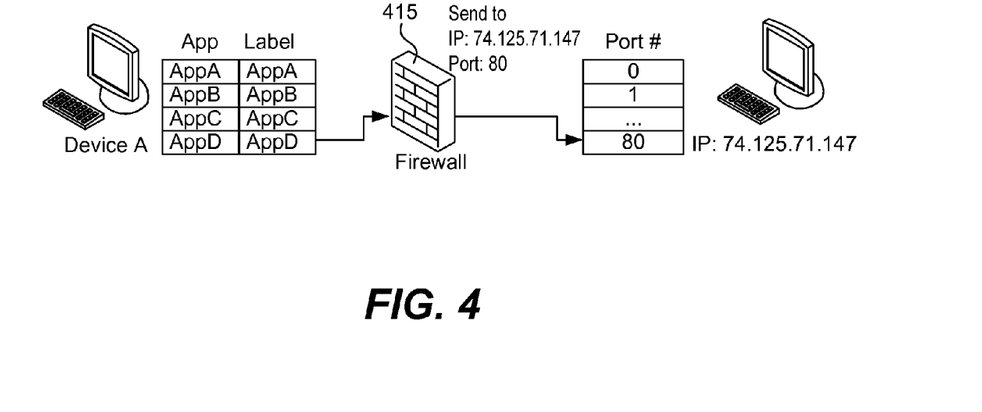
FIG. 4 illustrates the use of security labels in a MAC aware firewall in accordance with one embodiment of the present invention.

FIG. 4 illustrates the use of security labels in rule matching and the granularity it provides with minimal modifications to the security systems on a device, substitute paths for labels to work with path-based MACs. In the preferred embodiment of this invention a firewall 415 using iptables is made SMACK aware by extending its existing functionality to be able to match against the security labels stored directly as extended attributes (or in another form indirectly) assigned to objects in a file-system. The extension to iptables can be accomplished with a custom iptables-matching module makes available a new option in the rules for iptables. This extension also works for SELinux and other label-based MACs. The enhancement also contains a path-based matching component so that it works with MACs that use path-based enforcement as AppArmor™ and Tomoyo™ do.

This extension allows for current MAC mechanisms to remain untouched and for existing firewall rule sets to be easily modified with an additional matching parameter for security labels. In a traditional firewall, if a rule in the system existed to allow access to an ip address A.B.C.D at Port 80 coming from ip address E.F.G.H any application that generated a packet that matched this rule would be allowed through the firewall. However, with the present invention and extension to the firewall, specific applications can be granted access or conversely denied access to the above address and port as long as the security label matches. Essentially, this invention provides finer-grained network control that enhances security by enabling administrators to deny or allow access to network resources on an application-by-application basis.

An example of an iptables rule with the proposed rule extension is as follows:

iptables—A OUTPUT—d google.com—m seclabel—securitysmack64 com.maps.google—j ACCEPT
iptables—A OUTPUT—d*—j DROP The above rule would allow an application with the security.SMACK64 label of com.maps.google, which in this example is the Google Maps application, to be allowed to send packets to the google.com domain and to drop all other packets destined for all other domains.

The labels can be acquired by the network layer using various techniques. As illustrative examples, the network layer can retrieve the label of the process that is sending data to a socket on a host via kernel space by for example:

1) requesting the current security setting from the loaded MAC directly via: current→cred→security or by calling current_security( ) or
2) If using SMACK as the MAC this can be resolved to a SMACK specific label by using: smk_of_task:
a. smk_of_current( ) is the same as smk_of_task(current_security( );
b. smk_of_task will present a pointer to the smack label in a task blob, other tasks can be passed to smk_of_task
c. current_security( ) retrieves the security structure for the current task, calling current_security( ) is the same as current→cred→security.

Additionally, if the network layer is running in user-space it can obtain the label a process is running with by obtaining the process ID of the process and querying the process utility (for example: ps) and supplying a special parameter (on Linux this is –Z) to see the labels each process is running with.

Figure 5:
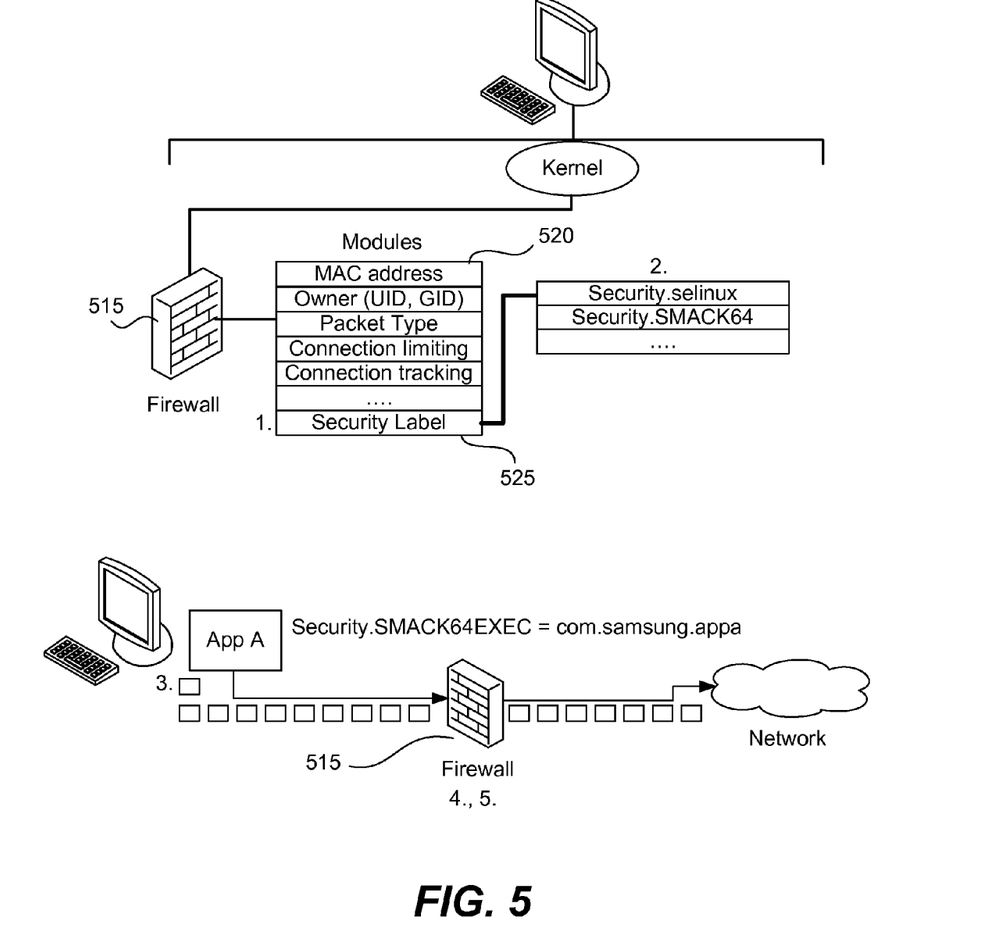
FIG. 5 illustrates a MAC aware firewall implementation compatible with a Linux® implementation in accordance with one embodiment of the present invention.

FIG. 5 illustrates a high level an example of implementation modifications for firewall 515 using the Linux Kernel as an example. The upper portion of the diagram illustrates that firewall 515 includes modules 520, including conventional firewall rule set modules such as Medium Access Control address, owner, packet type, connection limiting, and connection tracking. The additional new module 525 matches against existing labels, such as security SELinux or security SMACK64, but it may also match new labels. The new module 525 is responsible for matching against the security labels described in the extended attributes of file-system objects. The matches in the module can be generic or restricted to the security namespace. As shown in FIG. 5, in one implementation there are two such security extended attributes that the module would match against, security.selinux and security.SMACK64 for the respective MAC systems.

Also shown in the bottom portion of the diagram FIG. 5 in use an application App A generates packets that are to be sent to a network interface. The firewall 515 inspects the packets and looks to match them against the rules it ahs to determine what action to perform on them. In this example App A has an extended attribute or security label set for itself of security.SMACK64EXEC equal to com.security.appa. In this example, a packet is allowed out of the system by the firewall 515 if it was generated by a process having the extended attribute security label that matches the security label in module 525. This means when App A is executing it is running as the subject with the label com.security.apps. Based on the previous labeling, a rule can be added to the firewall system, iptables in this case, that can include the traditional restrictions like ip address, port number, mac address, etc; but can also include the new security label matching module that will provide another matching parameter to the rule before it can be considered a full match for a packet. Thus, any packet that is created by a process with a SMACK64EXEC label, in this example, equal to com.samsung.appa will have an action performed on it.

Figure 6:
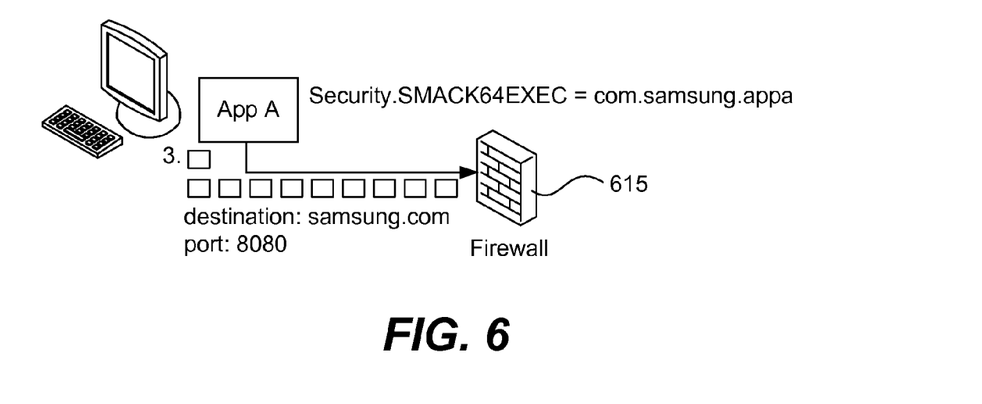
FIG. 6 illustrates a MAC aware Firewall having an output rule chain in accordance with one embodiment of the present invention.

FIG. 6 illustrates how firewall rules, in this case iptables, in firewall 615 follow a chain of rules, in this case the rules for packets that are leaving a device (OUTPUT), and looking for the first rule to match the packet. In this example, following from the example in FIG. 5, the generating process has a SMACK64EXEC label of com.samsung.appa, with packets destined for the Samsung.com domain at port 8080. The second to last rule in this example is the rule that matches the generated packets and based on the operation is says to perform, allow, will allow packets out of the device to the requested domain and port from the labeled process. While the example of FIG. 6 describes only ways of dropping or allowing packets in a MAC aware firewall, more generally some of the robust features of firewalls, including iptables, such as rate and connection limiting, can be applied on a per label/application basis in a MAC aware firewall.

While a preferred embodiment utilizes security labels, more generally, the matching module can have an extension to match against the path in a file-system that a process is running from. For example, MACs such as AppArmor™ and Tomoyo™ do not use security labels. Thus, a path based enforcement enhancement can be utilized in MACs that do not utilize security labels. That is, a MAC aware firewall can utilize different forms of MAC enforcement mechanisms, such as one or both of labels and paths.

Figure 7A:
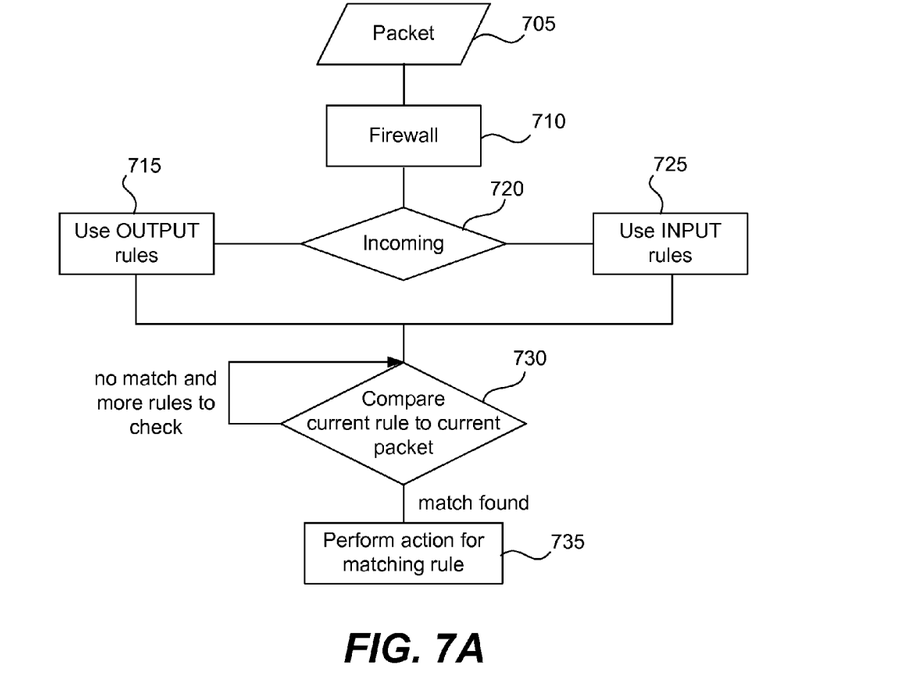
FIGS. 7A and 7B illustrates flow diagrams for overall firewall packet processing and packet process with a security label module is invoked in accordance with one embodiment of the present invention.
Figure 7B:
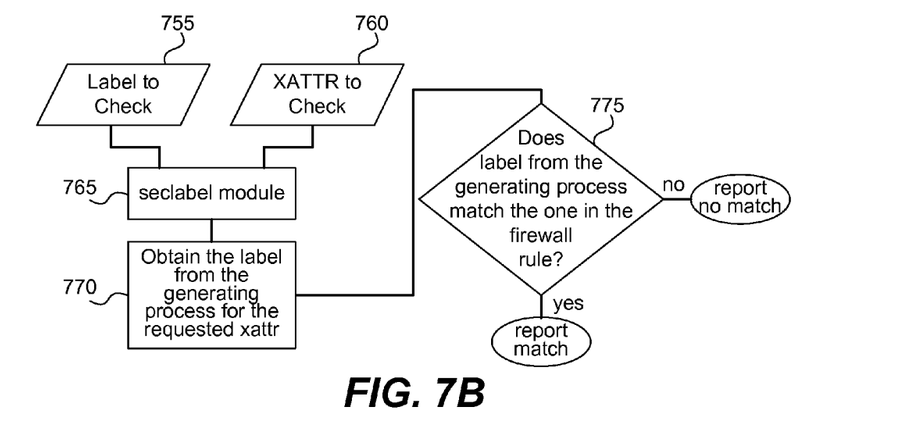

FIGS. 7A and 7B illustrate a high level overview of the flow diagram for matching and checking firewall rules in accordance with one embodiment. Referring to FIG. 7A, packets 705 that are sent into or out of the system first pass through the firewall 7101. A decision 720 is made if the packet is incoming 725 or outgoing 715 because if there are different rules depending on the direction of the packet, this decision determines which rule-set to match against. Once the appropriate rule-set has been selected the current packet is parsed and matched against the current rule in the list, if a match is not found the next rule in the list is checked and matched against the packet. The process of matching 730 against the packet continues until there is an exact match, at which point the operation the rule says to perform is performed on the packet. If no match is found, the packet, depending on the implementation of the firewall, will either be allowed or dropped.

Referring to FIG. 7B, during the matching process, if a rule specifies that it wants to use the security label (seclabel) matching module 765, the module is invoked. Within the module 765 the label 755 and extended attribute type 760 that the rule says needs to be matched is passed into the algorithm, while also obtaining the label 770 from the generating process for the requested extended attribute. If there is a match 775 from our module then the match is reported to the system, otherwise no match is reported. The module will not only check security labels, but will also check paths if that parameter is passed into the module, rather than a security label.

One aspect of the present invention is that is uses the security label or path of the executing process that is sending and/or receiving data with the network interface for enforcement within the iptables/NetFilter framework. The enforcement in the present invention can work within iptables, thus keeping the network control at the firewall without requiring modifications to the MAC mechanisms by taking advantage of the existing labels or defined paths that MAC mechanisms rely on for policy enforcement and use them in the firewall.

One aspect of the present invention is that security labels are not attached to packets for transmission across a network. The labels are not attached to the packet; rather, the labels (or paths) of a process that is either generating or receiving network packets is enforced locally and kept locally on the device. The present invention keeps the security label or path local to the system and enforces on the information it receives from information on the device that is sending or receiving the network data and the designated process that is responsible for the network traffic. This solution allows a system dedicated for firewalling to exist with one dedicated for other MAC functionality not related to networking while taking advantage of an existing solution that is well-understood and used in practice by extending it. There is no need to ensure packet labels have been transmitted properly and not modified or removed when traversing across networks, since the labels are kept and enforced locally to the device.

Figure 8:
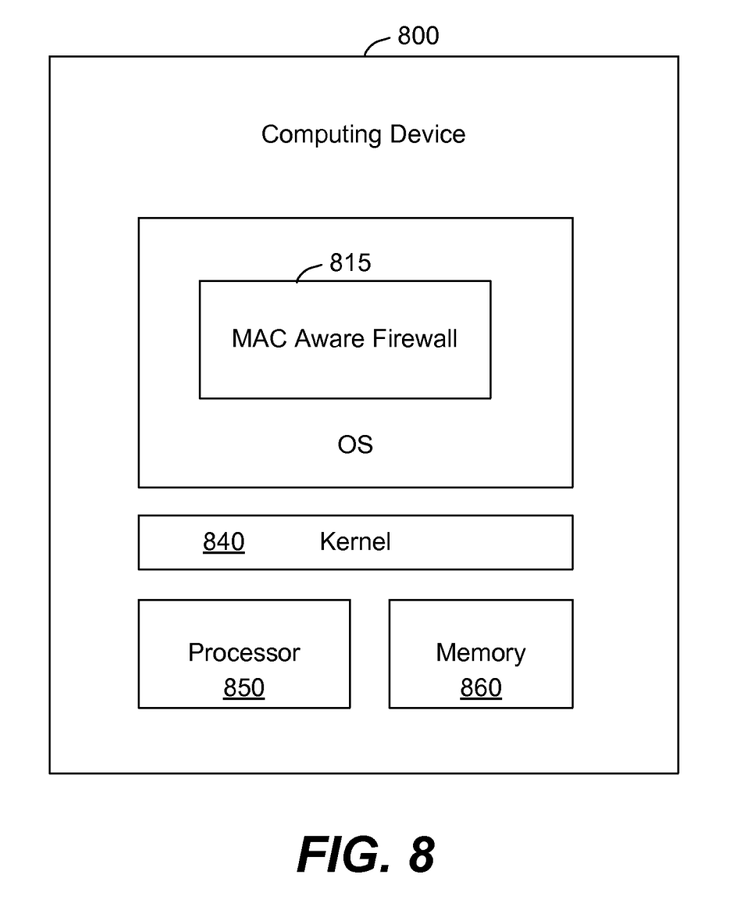
FIG. 8 illustrates the MAC aware firewall in a computing device environment.

Besides providing improved functionality to such network control mechanisms as explained in the previous paragraph, the present invention also brings the following important advantages to devices that employ MAC based security frameworks like SLP:
1. Ease of security management
2. Performance improvements FIG. 8 illustrates an exemplary computing device 800 including a MAC aware firewall. The MAC aware firewall 815 is part of the Operating System layer. The computing device also includes a Kernel layer 840 and least one processor 850 and memory 860. While the firewall 815 may be installed on a computing device it will be understood that more generally firewall 815 may also be stored as computer program code on a non-transitory computer readable medium which when executed on a processor implemented the MAC aware firewall. The various aspects, features, embodiments or implementations of the invention described above can be used alone or in various combinations.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computing device, comprising:
a processor and a memory; and
a firewall, the firewall having a firewall rule set extended to include Mandatory Access Control (MAC) attributes for dynamically determining network resource access;
the firewall configured to examine MAC attributes of a process running within protection of the firewall that is generating or receiving packets and performing rule checking for the process based at least in part by comparing the MAC attributes of the process to the MAC attributes in the firewall rule set;
wherein the MAC attributes include at least one of: a label and a path attribute of a process;
wherein the firewall obtains MAC attribute information for the process based on local information on the computing device,
wherein the label is maintained and enforced locally on the computing device, and the label is not attached to the individual packets for transmission across a network.

2. The computing device of claim 1, wherein the firewall does not attach the MAC attributes in packets transmitted via the firewall.

3. The computing device of claim 1, wherein the firewall obtains MAC attributes for a process directly or indirectly from the process via a network layer.

4. The computing device of claim 1, wherein the MAC attributes include security labels for SELinux or SMACK.

5. The computing device of claim 1, wherein the firewall includes a rule chain for a set of MAC attributes.

6. The computing device of claim 1, wherein the MAC attributes are associated with a socket connection for a process.

7. The computing device of claim 1, wherein the firewall rule set includes address rules such that the firewall performs rule-checking based on addresses in addition to rule-checking based on MAC attributes.

8. The computing device of claim 1, wherein the MAC attributes dynamically determine network resource access on an application-by-application basis.

9. The computing device of claim 1, wherein the firewall rule set is modified with an additional matching parameter for security labels.

10. The computing device of claim 9, wherein specific applications are granted access or denied access to specified Internet protocol (IP) addresses and ports based on matching a security label by a firewall module.

11. A method of performing access control in a firewall having a firewall rule set extended to include Mandatory Access Control (MAC) attributes associated with local applications comprising:
examining MAC attributes of a process running within protection of the firewall that is generating or receiving packets;
performing rule checking for the process based at least in part by comparing the MAC attributes of the process to the MAC attributes in the firewall rule set;
wherein the MAC attributes include at least one of: a label and a path attribute of a process;
wherein the firewall obtains MAC attribute information for the process based on local information on a device, and dynamically determines network resource access,
wherein the label is maintained and enforced locally on the computing device, and the label is not attached to the individual packets for transmission across a network.

12. The method of claim 11, wherein the firewall does not attach the MAC attributes in packets transmitted via the firewall.

13. The method of claim 11, wherein the firewall obtains MAC attributes for the process directly or indirectly from the process via a network layer.

14. The method of claim 11, wherein the MAC attributes include security labels for SELinux or SMACK.

15. The method of claim 11, wherein the firewall includes a rule chain for a set of MAC attributes.

16. The method of claim 11, wherein the MAC attributes are associated with a socket connection for a process.

17. The method of claim 11, wherein the firewall rule set includes address rules such that the firewall performs rule-checking based on addresses in addition to rule-checking based on MAC attributes.

18. A computer program product comprising computer program code stored on a non-transitory computer readable medium which, when executed on a processor implements a method for using a firewall having a firewall rule set extended to
include Mandatory Access Control (MAC) attributes associated with local applications including:
examining MAC attributes of a process running within protection of the firewall that is generating or receiving packets;
performing rule checking for the process based at least in part by comparing the MAC attributes of the process to the MAC attributes in the firewall rule set;
wherein the MAC attributes include at least one of: a label and a path attribute of a process;

wherein the firewall obtains MAC attribute information for the process based on local information on a device, and dynamically determines network resource access, wherein the label is maintained and enforced locally on the computing device, and the label is not attached to the individual packets for transmission across a network.

19. The computer program product of claim 18, wherein the firewall does not attach MAC attributes in packets transmitted via the firewall.

20. The computer program product of claim 18, wherein the firewall obtains the MAC attributes for the process directly or indirectly from the process via a network layer.

21. The computer program product of claim 18, wherein the MAC attributes include security labels for SELinux or SMACK.

22. The computer program product of claim 18, wherein the firewall includes a rule chain for a set of MAC attributes.

23. The computer program product of claim 18, wherein the MAC attributes are associated with a socket connection for a process.

24. The computer program product of claim 18, wherein the firewall rule set includes address rules such that the firewall performs rule-checking based on addresses in addition to rule-checking based on MAC attributes.

* * * * *